United States Patent Office 2,914,439
Patented Nov. 24, 1959

2,914,439

PENTACHLOROCYCLOPENTENE - 3 - ONE - 2 - YL PHOSPHONATES AND INSECTICIDAL USE THEREOF

Sidney B. Richter, Chicago, Ill., assignor to Velsicol Chemical Corporation, Chicago, Ill., a corporation of Illinois No Drawing. Application March 14, 1957
Serial No. 645,926

10 Claims. (Cl. 167—30)

This invention relates to new compositions of matter. In particular it relates to phosphonates of pentachlorocyclopentenone and pentachlorocyclopentenethione.

One object of the present invention is the preparation of new halogenated phosphonates.

Another object of the present invention is the preparation of new agricultural chemicals, particularly insecticides and miticides.

Still another object of the present invention is the preparation of new compositions containing the pentahalocyclopentenone or pentahalocyclopentenethione configuration.

The compositions of the present invention include the compounds of the following structure:

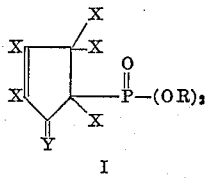

I wherein each X is independently selected from the group consisting of chlorine and bromine; Y is selected from the group consisting of sulfur and oxygen; and each R is independently selected from the group consisting of aliphatic, cycloaliphatic, and aryl radicals. In many instances the compositions of structure I wherein R is as previously defined and contains from 1 to 14 carbon atoms are preferred.

Of particular interest are the compositions of the above structure where X is chlorine, Y is oxygen and R is a lower alkyl or alkenyl radical. The radical represented by R in structure I can contain halogen atoms or other desirable substituents such as sulfur, oxygen and the like. Most interesting compounds are those wherein R of structure I contains from one to three halogen atoms.

The compositions of the present invention are prepared by the reaction of 2,3,4,4,5,5-hexachloro-2-cyclopentenone or 2,3,4,4,5,5-hexachloro-2-cyclopentenethione and a tertiary ester of phosphorous acid (hereinafter referred to as a triphosphite) chosen in accordance with the identity of R in structure I, that is the R groups being introduced into the product as part of the triphosphite reactant. This reaction is quite unexpected in view of the literature which shows the formation of phosphates and not phosphonates by the reaction of specific carbonyl compounds such as chloral containing halogen atoms in the position alpha to the carbonyl radical and a triphosphite as previously defined.

On the basis of this past work, it would appear that the present compositions could not be prepared by the direct reaction of a phosphite and a carbonyl compound containing an alpha halogen atom.

2,3,4,4,5,5-hexachloro-2-cyclopentenone, one of the reactants of the process of the present invention has been known to the art for over fifty years and is discussed by Newcomer and McBee in 71 J.A.C.S. 946, the latter describing its preparation from octachlorocyclopentene by the action of concentrated sulfuric acid. Similarly, the triphosphites are not new compounds, their preparation being reported in the literature.

The reaction of the present invention can be performed under atmospheric pressure or below or above atmospheric. Temperatures in the range of 0–100° C. are operable, although it is preferred to perform the reaction at temperatures between 0–25° C. This reaction can be efficiently run as a batch or a continuous process. The time of the reaction will depend on many factors such as the exact reaction temperature, equipment design, exact identity of reactants, contact area, and the like. While solvent is not required for the process of the present invention, organic solvents such as benzene, xylene can be used. Also, excess quantities of the reactant can be utilized as solvent.

Since the reaction is an equimolar reaction, the ratio of reactants should be approximately 1:1. However, as previously indicated, the process may be performed with an excess of either reactant.

The phosphites used in the present process are trisubstituted, that is, they contain three aliphatic, aryl or cycloaliphatic radicals attached to the three oxygen atoms of the phosphite configuration. They may contain one aryl group and two aliphatic radicals or other like combinations. Likewise, they may be substituted with halogen, oxygen, or other like groups. The following table illustrates the triphosphite reactants of the present invention and the product of its reaction in accordance with the present invention. However, this list is only for purpose of illustrating the present invention and should not be construed as a limitation thereon.

TABLE I

| Triphosphite | Product of Reaction with 2,3,4,4,5,5 - hexachloro - 2 - cyclopentenone | Product of Reaction with 2,3,4,4,5,5 - hexachloro - 2 - cyclopentenethione |
| --- | --- | --- |
| trimethyl | O,O - dimethyl - 1,3,4,5,5 - pentachlorocyclopentene - 3 - one - 2 - yl phosphonate. | O,O - dimethyl - 1,3,4,5,5 - pentachlorocyclopentene - 3 - thione - 2 - yl phosphonate. |
| triethyl | O,O - diethyl - 1,3,4,5,5 - pentachlorocyclopentene - 3 - one - 2 - yl phosphonate. | O,O - diethyl - 1,3,4,5,5-pentachlorocyclopentene - 3 - thione - 2 - yl phosphonate. |
| tri(chlorobutyl) | O,O - di(chlorobutyl) - 1,3,4,5,5 - pentachlorocyclopentene - 3 - one - 2 - yl phosphonate. | O,O - di(chlorobutyl) - 1,3,4,5,5 - pentachlorocyclopentene - 3 - thione - 2 - yl phosphonate. |
| triisooctyl | O,O - diisooctyl - 1,3,4,5,5 - pentachlorocyclopentene - 3 - one - 2 - yl phosphonate. | O,O - diisooctyl - 1,3,4,5,5 - pentachlorocyclopentene - 3 - thione - 2 - yl phosphonate. |
| triisopropylnitrile. | O,O - diisopropylnitrile-1,3,4,5,5 - pentachlorocyclopentene - 3 - one - 2 - yl phosphonate. | O,O - diisopropylnitrile-1,3,4,5,5 - pentachlorocyclopentene - 3 - thione - 2 - yl phosphonate |
| tri(1-methyl-1-carboethoxymethyl). | O,O - di(1 - methyl - 1 - carbo - ethoxy - methyl) - 1,3,4,5,5 - pentachlorocyclopentene - 3 - one - 2 - yl phosphonate. | O,O - di(1 - methyl - 1 - carbo - ethoxy - methyl) - 1,3,4,5,5 - pentachlorocyclopentene - 3 - thione - 2 - yl phosphonate. |
| tri [1-(N.N-dibutyl carbamyl) methyl]. | O,O - di [1-(N.N.dibutyl carbamyl) methyl] - 1,3,4,5,5 - pentachlorocyclopentene - 3 - one - 2 - yl phosphonate. | O,O - di [1-(N.N-dibutyl carbamyl) methyl] - 1,3,4,5,5 - pentachlorocyclopentene - 3 - thione - 2 - yl phosphonate. |
| trimenthyl | O,O - dimenthyl - 1,3,4,5,5 - pentachlorocyclopentene- 3 - one - 2 - yl phosphonate. | O,O - dimenthyl - 1,3,4,5,5 - pentachlorocyclopentene - 3 - thione - 2 - yl phosphonate. |
| 1,2-dimethylethylene methyl | O,O-1,2-dimethylethylene - 1,3,4,5,5 - pentachloro - cyclopentene - 3 - one - 2 - yl phosphonate. | O,O-1,2-dimethylethylene - 1,3,4,5,5 - pentachloro - cyclopentene - 3 - thione - 2 - yl phosphonate. |
| di(catechol)beta chloroethyl. | O,O - catechol -1,3,4,5,5 - pentachlorocyclopentene - 3 - one - 2 - yl phosphonate. | O,O - catechol - 1,3,4,5,5 - pentachlorocyclopentene - 3 - thione - 2 - yl phosphonate. |

When a phosphite reactant containing dissimilar radicals attached to its three oxygen atoms is utilized in the present process there can be prepared a mixture of the phosphonates of the present invention. This mixture may be used without separation of its components or the phosphonates can be separated by distillation or other like methods. When the isomer of 2,3,4,4,5,5-hexachloro-2-cyclopentenone, namely 2,3,4,4,5,5-hexachloro-3-cyclopentenone, is reacted with a tri-substituted phosphite in accordance with the present invention, there is produced new, valuable phosphorous-containing organic compositions likewise containing the pentachlorocyclopentene configuration.

The following examples illustrate the preparation of the new compositions of the present invention, but should not be construed as imposing limitations on the present invention:

*Example I*

PREPARATION OF O,O-DIETHYL-1,3,4,5,5-PENTACHLOROCYCLOPENTENE-3-ONE-2-YL PHOSPHONATE 2,3,4,4,5,5-hexachloro-2-cyclopentenone (43.5 grams; 0.15 mol) was placed in a three-necked glass reaction vessel equipped with addition funnel, reflux condenser, thermometer and stirrer, and containing benzene (150 ml.). The solution was cooled to 2° C. by means of an ice-water bath. Triethyl phosphite (24.0 grams; 0.15 mol) in benzene (100 ml.) was added slowly from the addition funnel. The addition time was 1½ hours during which time the temperature of the reaction mixture was maintained between about 2–5° C. The reaction solution was then refluxed for 1½ hours, at the end of which time the solvent and unreacted reactants were removed under reduced pressure. The desired product was recovered by distillation of the residue as the cut with a boiling point of 152°–160° C. at 0.77 mm. Hg pressure.

The chlorine content was analyzed and found to be 46.01% as compared to a theoretical chlorine content of 45.41% for $C_9H_{10}Cl_5O_4P$. The structure of the product was confirmed by infrared analysis which showed the presence of a carbonyl group.

*Example II*

PREPARATION OF O,O-DI-(CHLOROMETHYL)-1,3,3,4,5-PENTACHLOROCYCLOPENTENE-3-ONE-2-YL PHOSPHONATE 2,3,4,4,5,5-hexachloro-2-cyclopentenone (28.9 grams; 0.10 mol) is placed in a three-necked glass reaction vessel equipped with thermometer, stirrer, reflux condenser and addition funnel, and containing benzene (150 ml.). The solution is cooled to about 2° C. by an ice-water bath and tri-(chloromethyl) phosphite (22.9 grams: 0.10 mol) in benzene (100 ml.) is added thereto from the addition funnel in a 1½-hour addition time during which time the temperature of the reaction mixture is maintained at about 2–5° C. Then the reaction mixture is refluxed for approximately 1½ hours and solvent and remaining starting material is removed under reduced pressure. The product is then purified from the residue.

*Example III*

PREPARATION OF O,O-CATECHOL-1,3,4,5,5-PENTACHLOROCYCLOPENTENE-3-ONE-2-YL PHOSPHONATE 2,3,4,4,5,5-hexachloro-2-cyclopentenone (28.9 grams; 0.10 mol) is placed in a three-necked glass reaction vessel equipped with thermometer, stirrer, reflux condenser, and stirrer, and containing benzene (150 ml.). The solution is cooled to about 2° C. by an ice-water bath and di-(catechol)beta chloro ethyl phosphite (21.9 grams; 0.10 mol) in benzene (100 ml.) is added thereto from the addition funnel in a 1½-hour period during which time the temperature is maintained at about 2–5° C. Then the reaction mixture is refluxed for approximately 1½ hours at which time solvent and unreacted starting material is removed under reduced pressure. Product is then purified from the residue.

As previously indicated, the compositions of the present invention are highly useful in the control of insects, mites, and other undesirable plant pests. These compounds provide superior protection against numerous pests which prevent or inhibit the growth of valuable plants. Indicative of these valuable properties of the present compounds are the following results from tests performed with the compositions of the present invention in the control of said plant pests.

In the first test, O,O-1-diethyl-1,3,4,5,5-pentachlorocyclopentene-3-one-2-yl phosphonate was tested against the Mexican bean beetle. The test compound was formulated into a 10% by weight wettable powder which was dispersed in a quantity of water necessary for a final concentration 0.4% by weight of the actual test compound. Cranberry bean plants were dipped in this dispersion and dried. Subsequently untreated Mexican bean beetles were placed thereon for 48 hours. At the end of this time the percent mortality of the beetles was 100%, showing the high toxicity of the compound of the present invention.

A second test was performed to confirm the above indicated high insecticidal toxicity of these new compounds. In these tests the test insect was the pea aphid. O,O - diethyl-1,3,4,5,5-pentachlorocyclopentene-3-one-2-yl phosphonate was formulated into a 10% by weight wettable powder and dispersed in water to prepare a dispersion containing 0.4% by weight actual test compound. This dispersion was sprayed onto caged pea aphids by spraying at 20 pounds pressure for approximately five seconds. The treated insects were then removed from the cage and caged on untreated Windsor broad bean plants. Forty-eight hours after the above treatment the percent mortality of the pea aphids was 100%, verifying the high insecticidal toxicity of these compounds.

Many compounds which are good insecticides are not capable of controlling mites, a most destrictive group of plant pests. In order to determine the miticidal activity of the present compounds, the following test was performed against the greenhouse red spider. O,O-diethyl-1,3,4,5,5-pentachlorocyclopentene-3-one-2-yl phosphonate was formulated into a 10% by weight wettable powder and dispersed in water at a concentration of 0.4% by weight of the phosphonate. Red spider infested cranberry bean plants were dipped in this dispersion. Seventy-two hours after this treatment the mortality of the spiders was 100 percent.

Thus it can be said that the new compositions of the present invention are superior insecticides and miticides.

These new compounds can be applied to the material, plants, or area needing protection from injurious crop pests by any of the means known to the art for the application of insecticides and miticides. They can be used in their pure form; they can be formulated with inert carriers, stickers, dispersion agents, wetting agents, and the like; they can be dissolved in organic solvents such as kerosene, benzene, etc.; they can be utilized in conjunction with other pest control agents; or they can be used in other forms known to the art. Examples of formulations of the compositions of the present invention which are readily usable are as follows. In these ensuing examples the term "phosphonate of present invention" means any one phosphonate of the present invention or combinations thereof.

*Example IV*

| | Percent by weight |
|---|---|
| Phosphonate of present invention | 50 |
| Celite 209 | 50 |

Celite 209 is a diatomaceous earth utilized as a relatively inert carrier. This formulation may be ground into a dust or granular. It is of value in treatment of seeds, freshly seeded land and young crops.

Example V

| | Percent by weight |
|---|---|
| Phosphonate of present invention | 70 |
| Micro-Cel 800 | 27 |
| Triton X–100 | 3 |

Micro-Cel 800 is a synthetic, relatively inert, porous carrier material consisting substantially of calcium silicate. Triton X–100 is a wetting agent chemically an alkyl, aryl polyether alcohol. This formulation is a 70% wettable powder suitable for slurry-type treatment.

Example VI

| | Percent by weight |
|---|---|
| Phosphonate of present invention | 60 |
| Isopropyl acetate | 23 |
| Isopropyl alcohol | 10 |
| Atlas G–1690 | 7 |

Atlas G–1690 is a commercially obtainable emulsifier essentially a nonyl-phenol-ethylene oxide detergent. This formulation is an emulsifiable concentrate.

These examples illustrate formulations in which the present compounds can be used, but their use is not limited to use therein. As previously indicated, these novel compounds can be used in any of the means known to the art, and thus the above illustrations do not limit their application.

The actual application of these compounds to the area or material being protected can likewise be carried out by the methods known to this art, such as by spraying, dusting, dipping, and the like, selecting the most suitable formulation by the desired method of application.

In addition to the aforementioned utility of the new compositions of the present invention as pest control agents, they also have other valuable uses, such as lube oil additives, antifoaming agents, plasticizers, stabilizers, antistatic agents, hydraulic fluid additives, textile conditioners, and the like.

I claim:

1. 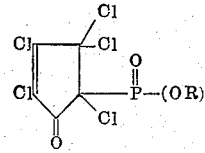

wherein R is a radical selected from the group consisting of unsubstituted alkyl, chloroalkyl, cyanoalkyl, carbethoxyalkyl, and N,N-dibutyl carbamyl alkyl containing from 1 to 14 carbon atoms.

2. O,O-di(chloromethyl) - 1,3,4,5,5 - pentachlorocyclopentene-3-one-2-yl phosphonate.

3. O,O-diethyl - 1,3,4,5,5 - pentachlorocyclopentene-3-one-2-yl phosphonate.

4. O,O-dimethyl - 1,3,4,5,5 - pentachlorocyclopentene-3-one-2-yl-phosphonate.

5. O,O-diisooctyl - 1,3,4,5,5 - pentachlorocyclopentene-3-one-2-yl-phosphonate.

6. O,O-diisopropylnitrile - 1,3,4,5,5 - pentachlorocyclopentene-3-one-2-yl-phosphonate.

7. The method of controlling insect and mite pests which comprises the application of a lethal quantity of the composition of claim 1.

8. A process for protecting plant growth from attack by insects and mites which comprises exposing said material to an effective quantity of the composition of claim 1.

9. A composition comprising the composition of claim 1 and an inert carrier.

10. A process for the destruction of insect and mite pests which comprises exposing said pests to a lethal quantity of the composition of claim 1.

References Cited in the file of this patent

UNITED STATES PATENTS

| 2,609,376 | Ladd et al. | Sept. 2, 1952 |
| 2,806,047 | Raab et al. | Sept. 10, 1957 |

UNITED STATES PATENT OFFICE
CERTIFICATE OF CORRECTION

Patent No. 2,914,439                      November 24, 1959

Sidney B. Richter

It is hereby certified that error appears in the printed specification of the above numbered patent requiring correction and that the said Letters Patent should read as corrected below.

Column 3, line 45, Example II, in the heading, for "-1,3,3,4,5-" read -- -1,3,4,5,5- --; column 4, line 39, for "destrictive" read -- destructive --; column 6, lines 5 to 7, for that portion of the formula reading Signed and sealed this 12th day of July 1960.

(SEAL)
Attest:

KARL H. AXLINE                      ROBERT C. WATSON
Attesting Officer                     Commissioner of Patents